Figure 1:
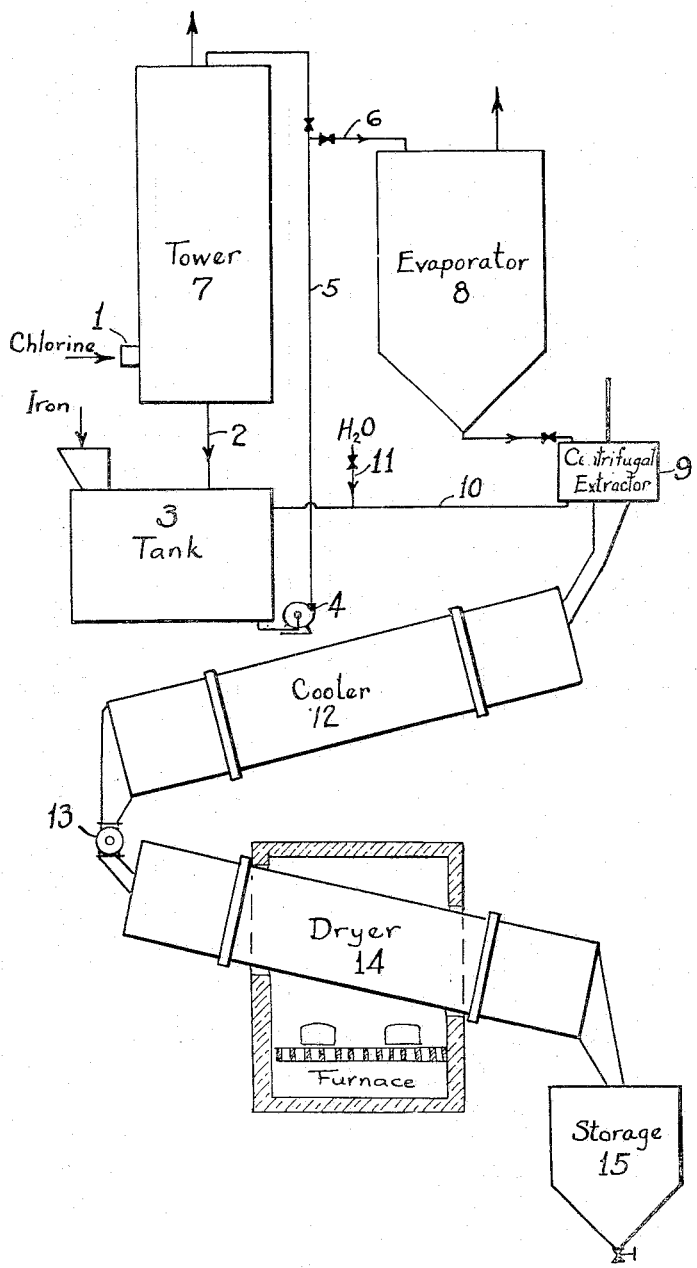

Dec. 5, 1933.  C. F. PRUTTON  1,938,461

METHOD FOR PREPARING ANHYDROUS IRON CHLORIDES

Filed Feb. 11, 1932

INVENTOR
Carl F. Prutton
BY Fay, Oberlin and Fay
ATTORNEYS

Patented Dec. 5, 1933

1,938,461

UNITED STATES PATENT OFFICE 1,938,461

METHOD FOR PREPARING ANHYDROUS IRON CHLORIDES

Carl F. Prutton, Cleveland, Ohio, assignor to The Dow Chemical Company, Midland, Mich., a corporation of Michigan Application February 11, 1932. Serial No. 592,293

4 Claims. (Cl. 23—87)

The invention regards an improved method for the preparation of substantially anhydrous iron chlorides.

It has long been known that the action of aqueous hydrochloric acid upon iron in the presence of excess iron forms a ferrous chloride solution which, upon concentration, will yield ferrous chloride tetrahydrate, $FeCl_2.4H_2O$, crystals. However, attempts to produce anhydrous ferrous chloride directly from the tetrahydrate salt have been unsuccessful in commercial practice, since dehydration of the tetrahydrate results in hydrolysis and only basic salts are left. Likewise, attempts to dehydrate the ferric chloride hexahydrate, $FeCl_3.6H_2O$, result in hydrolysis. There are methods for preparing the anhydrous ferrous salt from ferrous chloride tetrahydrate, for instance the double ammonium salt may be formed by dissolving the tetrahydrate in an ammonium chloride solution, evaporating the solution of the double salt to dryness and heating the residue in the absence of air. The water and ammonium chloride escape and leave the anhydrous ferrous chloride behind. Processes of this type involve the recovery of ammonium chloride, or comparable agent, and are rendered difficult by the nature of the ammonium chloride, it being extremely difficult, if not impossible, to approach a quantitative recovery thereof. Other methods heretofore available for the preparation of anhydrous ferrous chloride resolve themselves into; (1) treatment of the metal with free chlorine; (2) chlorination of the sulphide or oxide in the presence of carbon; or (3) reduction of ferric chloride. Treating iron directly with free chlorine to secure anhydrous ferrous chloride is at the best a difficult procedure which has not been adapted to commercial practice. Processes of the second type involve a large number of steps and cannot be conducted economically. A process of the third type, for making ferrous chloride from ferric chloride, would not be commercially sound, since in reality ferric chloride is generally the end-product desired.

Recent advances in the use of ferric chloride as a coagulant in waste disposal and water purification have demonstrated the urgent need for a process for making cheap anhydrous ferric chloride. I have found that anhydrous ferric chloride can most advantageously be produced by simply chlorinating anhydrous ferrous chloride. Anhydrous ferric chloride can, then, be produced at the lowest cost if anhydrous ferrous chloride be also available at a correspondingly low cost.

It is accordingly an object of this invention to provide a practical, commercial, economical method for preparing anhydrous ferrous chloride cheaply. Additional objects and advantages will be seen in the method as a description of a specific embodiment thereof progresses.

I have been able to secure ferrous chloride dihydrate, $FeCl_2.2H_2O$, by evaporating a ferrous chloride solution at an elevated temperature so as to precipitate the dihydrate crystals and effecting a separation of the crystals from the mother liquor at a temperature above about 90° C. I have found that it is possible, in the substantial absence of air or oxygen, to dehydrate the ferrous chloride dihydrate compound directly without hydrolysis, and without departing from the solid phase, in order to secure substantially anhydrous ferrous chloride. I may prepare a ferrous chloride solution in any suitable manner, my preferred mode being hereinafter disclosed, and I precipitate the dihydrate of the ferrous chloride by evaporating the ferrous chloride solution at atmospheric pressure to a temperature of about 120° C. I then effect a separation of the dihydrate crystals from the mother liquor at a temperature above 90° C., since above this temperature none of the tetrahydrate is formed. Having separated the dihydrate crystals from the mother liquor, I then dry them at a temperature up to about 230° C. to remove both occluded moisture and molecularly retained water of crystallization, thus securing substantially anhydrous ferrous chloride.

To the accomplishment of the foregoing and related ends the invention, then, consists of the method hereinafter fully described and particularly pointed out in the claims, the annexed drawing and the following description setting forth in detail one mode of carrying out the invention, such disclosed mode illustrating, however, but one of the various ways in which the principle of the invention may be realized.

In said annexed drawing:

The single figure represents diagrammatically one form of apparatus adapted for carrying out the invention.

Referring to the drawing, tank 3 contains a solution of ferrous chloride. In initially starting operation, some iron is placed in the tank and sufficient hydrochloric acid added to form a quantity of ferrous chloride solution. After operation is once begun, no more acid is added. Pump 4 withdraws the ferrous chloride solution from the tank and circulates it through pipe 5 to the top of tower 7 wherein it is distributed in gravitational flow. Chlorine gas is admitted through pipe 1 to tower 7 and ascends against the downward flow of iron chloride solution. Said chlorine is absorbed by the ferrous chloride solution and acts to convert a portion of it to ferric chloride. The chlorine flow is regulated so that all of it is absorbed by the solution in tower 7. The mixed solution of ferrous and ferric chlorides runs out the bottom of the tower through connecting pipe 2 into tank 3. Iron is intermittently added to the solution in tank 3 in such proportion that metallic iron is always present so as to reduce the ferric chloride in the tower effluent to ferrous chloride. Water, which may be in part the mother liquor from extractor 9, is admitted through pipe 11 to tank 3 in such amount as to control the gravity of the solution in said tank. After a sufficient quantity of ferrous chloride solution of any desired gravity, say between 25-45° Baumé, is secured in tank 3, a portion of it may be withdrawn from the tank through pipe 6 to evaporator 8 wherein it is concentrated to a temperature of about 120° C so as to precipitate out $FeCl_2.2H_2O$ crystals. The crystals are drawn off as a slurry with some of the mother liquor to a centrifugal extractor 9 heated, as with steam, to about 90° C. or above. This throws off the mother liquor which may be returned to tank 3 through pipe 10. The crystals are then passed to cooler 12 and forwarded by feeder 13 to dryer 14 wherein drying and dehydration is accomplished at a temperature of about 230° C., and substantially anhydrous ferrous chloride is produced which is then passed to storage 15.

While I have described the operation of the process as being intermittent, it may advantageously be conducted as a continuous process. The iron chloride solution may be made to circulate continuously from tank 3 through pipe 5 to chlorinating tower 7 and return through connection 2 to tank 3. A suitable portion of the ferrous chloride solution passing up pipe 5 may be diverted to the evaporator 8, and the requisite amount of water added to tank 3 so as to maintain an approximately constant gravity of the solution therein.

The anhydrous ferrous chloride thus prepared may then be passed in intimate contact with dry chlorine gas to chlorinate it substantially to anhydrous ferric chloride. In effecting this chlorination, I have found it expedient to pulverize the anhydrous ferrous salt so that substantially all of it will pass through a standard Tyler 40-mesh screen. It is also preferable that during chlorination heat be supplied to the salt so as to raise its temperature to between about 140° and 190° C., preferably about 175° C., since this materially reduces the time required for chlorination, and increases the percentage conversion to the ferric salt. This method for the preparation of anhydrous ferric chloride possesses advantages not enjoyed by the processes heretofore developed.

It will be seen from the foregoing that certain advantages hereinafter enumerated are obtained by my improved process for the preparation of anhydrous iron chlorides. In an apparatus suitable for preparing anhydrous ferrous chloride as described, the only parts which are exposed to the corrosive action of a ferric chloride solution are tank 3, tower 7 and their connecting pipe 2. They can be very conveniently lined with brick or other corrosion resisting material. The balance of the equipment may be constructed of iron or steel, and if so constructed will resist for long periods the action of the ferrous chloride solution. For instance, iron pipe coils may be used for over a year in the concentrator for evaporating such solution. Further, in working my process I do not use any temperature sufficiently elevated as to require special heat resistant materials.

Unlike the tetrahydrate, the ferrous chloride dihydrate crystals do not hydrolyze when heated in substantial absence of air and do not melt below a red heat. It is therefore possible to dehydrate the crystals directly by heating without melting or decomposing them, thus making it unnecessary to form any double salts with ammonium chloride or the like as an intermediate step in making the anhydrous ferrous salt. The latter may then be chlorinated directly at a moderately elevated temperature to produce anhydrous ferric chloride of a high degree of purity. The raw materials which I use are preferably scrap iron, water and chlorine gas, which are all exceedingly cheap and easily obtainable.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. In a method for the preparation of ferrous chloride, the steps which consist in forming a ferrous chloride solution, evaporating said solution to precipitate ferrous chloride dihydrate crystals therefrom, and separating said crystals from their mother liquor at a temperature above about 90° C.

2. In a method for the preparation of substantially anhydrous ferrous chloride the steps which consist in forming a ferrous chloride solution, evaporating said solution at atmospheric pressure to a temperature of about 120° C. to precipitate ferrous chloride dihydrate crystals therefrom, separating said crystals from the solution at a temperature above about 90° C., and heating said crystals to a temperature of about 230° C. in the substantial absence of air to dehydrate the same.

3. In a method for the preparation of substantially anhydrous ferrous chloride the steps which consist in chlorinating a solution containing ferrous chloride to convert at least a portion of the ferrous chloride therein to ferric chloride, reducing said ferric chloride by contacting with metallic iron whereby the concentration of ferrous chloride in the original solution is increased, evaporating the strong ferrous chloride solution so prepared at atmospheric pressure to a temperature of about 120° C. to precipitate crystals of ferrous chloride dihydrate, removing such crystals and separating mother liquor therefrom by centrifuging at a temperature above 90° C. and dehydrating such crystals by heating to a temperature of about 230° C. in the substantial absence of air.

4. In a method for the preparation of substantially anhydrous ferrous chloride, the steps which consist in chlorinating a continuously circulating ferrous chloride solution of a gravity between 25-45° Baumé to convert at least a portion of the ferrous chloride therein to ferric chloride, subsequently reducing said ferric chloride to ferrous chloride by contacting with metallic iron, continually adding water to the solution whereby it is maintained at approximately constant gravity, continuously diverting a portion of the circulating ferrous chloride solution to a concentrator wherein it is evaporated at atmospheric pressure to a temperature of about 120° C. to precipitate crystals of ferrous chloride dihydrate, removing such crystals and separating mother liquor therefrom by centrifuging at a temperature above about 90° C., and dehydrating such crystals by heating to a temperature of about 230° C. in the substantial absence of air.

CARL F. PRUTTON.